US006484204B1

(12) United States Patent
Rabinovich

(10) Patent No.: US 6,484,204 B1
(45) Date of Patent: Nov. 19, 2002

(54) SYSTEM AND METHOD FOR ALLOCATING REQUESTS FOR OBJECTS AND MANAGING REPLICAS OF OBJECTS ON A NETWORK

(75) Inventor: Michael Rabinovich, Gillette, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/863,518

(22) Filed: May 24, 2001

Related U.S. Application Data

(62) Division of application No. 09/073,439, filed on May 6, 1998, now Pat. No. 6,256,675.
(60) Provisional application No. 60/046,999, filed on May 6, 1997.

(51) Int. Cl.[7] ............................................. G06F 15/173
(52) U.S. Cl. ..................... 709/226; 709/224; 709/241; 709/203
(58) Field of Search ................................. 709/241, 226, 709/217, 210, 238, 239, 214, 216, 105, 235, 224; 711/118, 122

(56) References Cited

U.S. PATENT DOCUMENTS

| | | | | |
|---|---|---|---|---|
| 5,341,477 A | * | 8/1994 | Pitkin et al. | 709/200 |
| 5,588,147 A | * | 12/1996 | Neeman et al. | 707/1 |
| 5,787,247 A | * | 7/1998 | Norin et al. | 709/220 |
| 5,896,506 A | * | 4/1999 | Ali et al. | 709/213 |
| 5,924,116 A | * | 7/1999 | Aggarwal et al. | 711/122 |
| 6,128,701 A | * | 10/2000 | Malcolm et al. | 711/133 |
| 6,138,162 A | * | 10/2000 | Pistriotto et al. | 709/229 |
| 6,167,427 A | * | 12/2000 | Robinovich et al. | 709/201 |
| 6,167,438 A | * | 12/2000 | Yates et al. | 709/216 |
| 6,256,675 B1 | * | 7/2001 | Robinovich et al. | 709/241 |
| 6,317,778 B1 | * | 11/2001 | Dias et al. | 709/214 |

* cited by examiner

Primary Examiner—Dung C. Dinh
Assistant Examiner—Abdullahi E. Salad

(57) ABSTRACT

A system and method for distributing requests for objects to hosts that store replicas of the objects, and for managing the placement of the replicas among hosts. Metrics for the historical demand of a replica at a host and the distance of the host from the requester of the object are evaluated and used to make decisions as to where to forward the request substantially independently from any input provided by a host to which a request is forwarded. This simplifies autonomous replica placement decisions made by hosts. A host substantially autonomously uses request metric and load information to select a replica to be deleted, migrated or replicated, and to delete, migrate or replicate a selected replica.

8 Claims, 7 Drawing Sheets

SYSTEM AND METHOD FOR ALLOCATING REQUESTS FOR OBJECTS AND MANAGING REPLICAS OF OBJECTS ON A NETWORK

CROSS-REFERENCE TO RELATED APPLICATION

The present application is a divisional application of and claims the benefit of U.S. patent application Ser. No. 09/073,439, filed on May 6, 1998 now U.S. Pat. No. 6,256,675 and claim benefit of Provisional appl. No. 60/046,999, filed May 6, 1997.

BACKGROUND OF THE INVENTION

Replication, known as "mirroring" in Internet parlance, is a technique that is used to address a scalability problem of popular Internet sites. As a popular site experiences a high rate of requests for objects stored at the site, the site can become overburdened and slow to respond, or even crash. As used herein, the term "object" refers to a piece of information. An object is embodied as a "replica," e.g., a file that is stored at a host, or a program (e.g., executable) and associated files that produce a piece of information. Examples of replicas include a page at a web site, a graphic file, an audio file, a cgi-bin file, etc. A request for an object is answered by sending a copy of a replica to the requester.

To solve the scalability problem, replicas of the requested objects can be stored at several locations throughout the network, thereby spreading the load of sending copies of the replicas of requested objects to requesting users.

It is important to properly decide where to store the replicas, and how to allocate requests for objects among the sites at which the replicas are stored. Often, these two problems are related in that a placement strategy will have important implications for the request allocation strategy, and vice versa.

Certain known replication (mirroring) techniques are implemented manually by system administrators, who monitor the demand for information on their sites and decide what data should be replicated and where the replicas should be stored. This task becomes daunting when the number of objects that can be requested and possible storage sites for replicas of such objects become large. Such a situation can arise, for example, in networks that are used to provide hosting services. Generally, a hosting service maintains and providing access to objects belonging to third-party information providers. For example, a hosting service may provide the infrastructure numerous web sites whose content is provided by third parties.

As the scale of a hosting system increases (i.e., as the number of objects and hosting servers on which replicas of the objects are stored becomes larger), the decision space for replica placement increases. A brute-force, worst case design becomes prohibitively expensive, and the problem of mirroring becomes too large and complex to be effectively handled manually by system administrators. Without appropriate new technology, system administration related to replica placement may become a factor limiting the scale to which hosting platforms may efficiently increase. This new technology must be able to automatically and dynamically replicate Internet objects in response to changing demand.

Some known protocols allocate requests among hosts that store mirrored objects by collecting load reports from the hosts and weighing host loads into a network-topology-based request distribution scheme. This approach, implemented in the Local Director made by CISCO Systems of California, is not well suited for dynamic replication on a global scale. This is because the request re-direction subsystem is highly distributed, forcing each host to send its load report to a large number of redirecting servers. This disadvantageously increases network traffic and can function poorly if the load reports are delayed in reaching all of the request redirectors. Further, request distribution for a given object becomes dependent on the popularity of many other objects that are co-located at the same host. This renders request distribution effectively non-deterministic and unpredictable, greatly complicating autonomous replica placement decisions.

Other known commercial products offer transparent load balancing among multiple Internet sites. See CISCO Distributed Director White Paper, <http://www.cisco.com/warp/public/734/distdir/dd_wp.htm>; IBM Interactive Network Dispatcher, <htttp://www.ics.raleigh.ibm.com/netdispatch/>; Web Challenger White paper, WindDance Network Corporation, <http://www.winddancenet.com/newhitepaper.html>, 1997. These products differ in the network level where the redirection of requests to physical replicas occur: CISCO's Distributed Director performs re-direction at the DNS level. A similar idea is used in E. Katz, M. Butler, and R. McGrath, *A Scalable Web Server: The NCSA Prototype*, Computer Networks and ISDN Systems, 27, pp. 155–164, September 1994, May 1994. The IBM Net Dispatcher and CISCO's Local Director redirect requests at the front-end router level, while Winddance's Web Challenger does so at the application level using redirection features of the HyperText Transfer Protocol (HTTP). None of these products offer dynamic replication or migration of replicas.

Existing protocols for performance-motivated dynamic replication rely on assumptions that are unrealistic in the Internet context. Wolfson et al propose a ADR protocol that dynamically replicates objects to minimize communication costs due to reads and writes. O. Wolfson, A. Jajodia, and Y. Huang, *An Adaptive Data Replication Algorithm*, ACM Transactions on Database Systems (TODS), Vol. 22(4), June 1997, pp. 255–314. Most Internet objects are rarely written. Recent trace studies (e.g., S. Manly and M. Seltzer, *Web Facts and Fantasy*, in USENIX Symp. on Internet Technologies and Systems, pp. 125–134, 1997) consistently show that 90% of requests are to static objects, and many of the remaining objects are dynamically generated responses to read-only queries. Therefore, minimizing communication costs due to reads and writes is not a suitable cost metric for the Internet. In addition, the Wolfson protocol imposes logical tree structures on hosting servers and requires that requests travel along the edges of these trees. Because of a mismatch between the logical and physical topology of the Internet, and especially because each node on the way must interpret the request to collect statistics (which requires in practice a separate TCP connection between each pair of nodes), this would result in impractically high delays in request propagation.

Heddaya and Mirdad's WebWave dynamic replication protocol was proposed specifically for the World Wide Web on the Internet. A. Heddaya and S. Mirdad, *WebWave: Globally Load Balanced Fully Distributed Caching of Hot Published Documents*, in Proc. 17th IEEE Intl. Conf. on Distributed Computing Systems, May 1997. However, it burdens the Internet routers with the task of maintaining replica locations for Web objects and intercepting and interpreting requests for Web objects. It also assumes that each request arrives in a single packet. As the authors note, this protocol cannot be deployed in today's networks.

Algorithmically, both ADR and WebWave decide on replica placement based on the assumption that requests are always serviced by the closest replica. Therefore, neither protocol allows load sharing when a server is overloaded with requests from its local geographical area. Objects are replicated only between neighbor servers, which would result in high delays and overheads for creating distant replicas, a common case for mirroring on the Internet. Also, ADR requires replica sets to be contiguous, making it expensive to maintain replicas in distant corners of a global network even if internal replicas maintain only control information.

The works of Bestavros (A. Bestavros, *Demand-based Document Dissemination to Reduce Traffic and Balance Load in Distributed Information Systems*, in Proc. of the IEEE Symp. on Parallel and Distr. Processing, pp. 338–345, 1995) and Bestavros and Cunha (A. Bestavros and C. Cunha, *Server-initiated Document Dissemination for the WWW*, Bulletin of the Computer Society technical Committee on Data Engineering, pp. 3–11. Vol. 19, No. 3, September 1996) appear to be the predecessors of WebWave. A. Bestavros, *Demand-based Document Dissemination to Reduce Traffic and Balance Load in Distributed Information Systems*, in Proc. of the IEEE Symp. on Parallel and Distr. Processing, pp. 338–345, 1995 proposes to reduce network traffic within an intranet by caching organization's popular objects close to the intranet's entry point. In a very large scale system, there would be many such entry points. Such a system would address the problems of choosing entry points at which to place object replicas and allocating requests to those replicas. These questions are not considered in A. Bestavros, *Demand-based Document Dissemination to Reduce Traffic and Balance Load in Distributed Information Systems*, in Proc. of the IEEE Symp. on Parallel and Distr. Processing, pp. 338–345, 1995. In A. Bestavros and C. Cunha, *Server-Initiated Document Dissemination for the WWW*, Bulletin of the Computer Society Technical Committee on Data Engineering, pp. 3–11, Vol. 19, No. 3, September 1996, Bestavros and Cunha discuss the benefits of replicating popular objects from the host server up the request tree, but no methods for doing so are described.

Baentsch et al (M. Baentsch, L. Baum, G. Molter. S. Rothkugel, and P. Sturm. *Enhancing the Web's Infrastructure: From Caching to Replication*, IEEE Internet Computing, Vol 1, No. 2, pp. 18–27, March/April, 1997) propose an infrastructure for performing replication on the Web, without describing methods for deciding on replica sets. Also, the infrastructure assumes gradual learning of the replica set by clients, which may hurt the responsiveness of the system. Gwertzman and Seltzer (J. Gwertzman and M. Seltzer. *The Case for Geographical Push-Caching*, Proc. Of the HotOS Workshop, 1994. Also available at <ftp://das-ftp.harvard.edu/techreports/tr-34-94.ps.gz> motivate the need for geographical proximity-based object replication. They propose to base replication decisions on the geographical distance (in miles) between clients and servers. This measure may not correctly reflect communication costs for fetching an object, since the network topology often does not correspond to the geographical distances.

The problem of placing objects in the proximity of requesting clients has also been addressed in research on file allocation (see φ Kure, *Optimization of File Migation in Distributed Systems*, Ph.D Dissertation, University of California (Berkeley), 1988. Also available as *Technical Report UCB/CSD 88/413*, Computer Science Division (ECCS), University of California (Berkeley), April 1988 for an early survey; and B. Awerbuch, Y. Bartal, and A. Fiat. *Competitive Distributed File Allocation*, In Proc. Of the 25th ACM Symposium on Theory of Computing, pp. 39–50, 1992; B. Awerbuch, Y. Bartal, and A. Fiat, *Distributed Paging for General Networks*, In Proc. of the 7th ACM-SIAM Symposium on Discrete Algorthms, pp. 574–583, January, 1996; and Y. Bartal, A. Fiat, and Y. Rabani, *Competitive Algorithms for Distributed Data Management*, in Proc. Of the 24th ACM Symposium on Theory of Computing, pp. 39–50, 1992 for more recent work). Early work in this area assumes a central point where decisions on object placement are made by solving an integer programming optimization problem. Even when the search space is heuristically pruned, the scale of our application would make such approaches impractical. Also, this approach requires the decision-making point to have complete information on network topology, server loads, and demand patterns.

More recently, the problem of obtaining distributed solutions for file allocation has been addressed. See B. Awerbuch, Y. Bartal, and A. Fiat, *Competitive Distributed File Allocation*, in Proc. Of the 25th ACM Symposium on Theory of Computing, pp. 164–173, May, 1993; B. Awerbuch, Y. Bartal, and A. Fiat, *Distributed Paging for General Networks*, in Proc. Of the 7th ACM-SIAM Symposium on Discrete Algorithms, pp. 574–583, January, 1996; Y. Bartal, A. Fiat, and Y. Rabani, *Competitive Algorithms for Distributed Data Management*, in Proc. Of the 24th ACM symposium on Theory of Computing, pp. 39–50, 1992. In B. Awerbuch, Y. Bartal, and A. Fiat, *Distributed Paging for General Networks* in Proc. Of the 7th ACM-SIAM Symposium on Discrete Algorithms, pp. 574–583, January, 1996, Awerbuch, Bartal, and Fiat design a distributed file allocation protocol and use the framework of competitive analysis (see D. Sleator and R. Tarjan. *Amortized Efficiency of List Update and Paging Rules*, Communications of the ACM, 28(2): 202–208, 1995) to show that their protocol is nearly optimal in terms of total communication cost and storage capacity of the nodes. However, they do not address the issue of load balancing among different servers. Moreover, while their work is significant from a theoretical standpoint, several issues concerning implementation of their protocol over the Internet are not addressed.

SUMMARY OF THE INVENTION

A system in accordance with an embodiment of the present invention includes a request distributor that receives a request for an object from a requester. The request distributor is coupled through a network to hosts that store replicas of the requested object. The request distributor determines the value of a request metric for each replica of the requested object, where the request metric is a historical measure of the number of requests for the object that have been forwarded to the host that stores the replica of the requested object. The request metric is determined substantially independently from any input from any host that stores a replica of any object to which a request for an object is forwarded. The request distributor also determines the value of a distance metric for each host at which the requested replica is stored. The distance metric measures the cost of communicating between the requester and the host. Based upon the values of the request metric and the distance metric, the request distributor selects a host to respond to the request for the object. The request distributor forwards the request to the selected host, which then responds directly or indirectly to the requester. In another embodiment, the request sends a redirect message to the requester, which then resends a request for the object to the correct host. In either case, the request distributor is said to have "assigned" the request to the host.

In accordance with an embodiment of the present invention, each host that stores a replica substantially autonomously decides whether to delete, migrate or replicate a replica stored at that host. The host stores a predetermined deletion threshold u and a replication threshold m for a first host such that vu is less than m, v being a real number. The host determines a request metric for the replica of the requested object stored at the first host. If the request metric is less than u, and if the replica is not the sole replica, then the replica is deleted from the first host. If the request metric is above u, and if it is determined that there is a second host to which it is beneficial to migrate the replica, then the replica is migrated to the second host. If the request metric is above m and no second host was identified to which it would have been beneficial to migrate the replica, then the host determines if there is a second host to which it is beneficial to replicate the replica of the requested object stored at the first host. If there is such a second host, then the replica stored at the first host is replicated at the second host.

The present invention advantageously selects a host to which to forward a request for an object substantially independently from input from any host to which such requests are forwarded from the request distributor. This is a considerable improvement over known techniques that rely upon such input because it reduces the network traffic that has to be generated to make a distribution decision, and reduces the complexity of such decision making. At the same time, the request distribution scheme of the present invention is very efficient. The distribution scheme also advantageously simplifies autonomous replica placement decisions.

DETAILED DESCRIPTION

Figure 1:
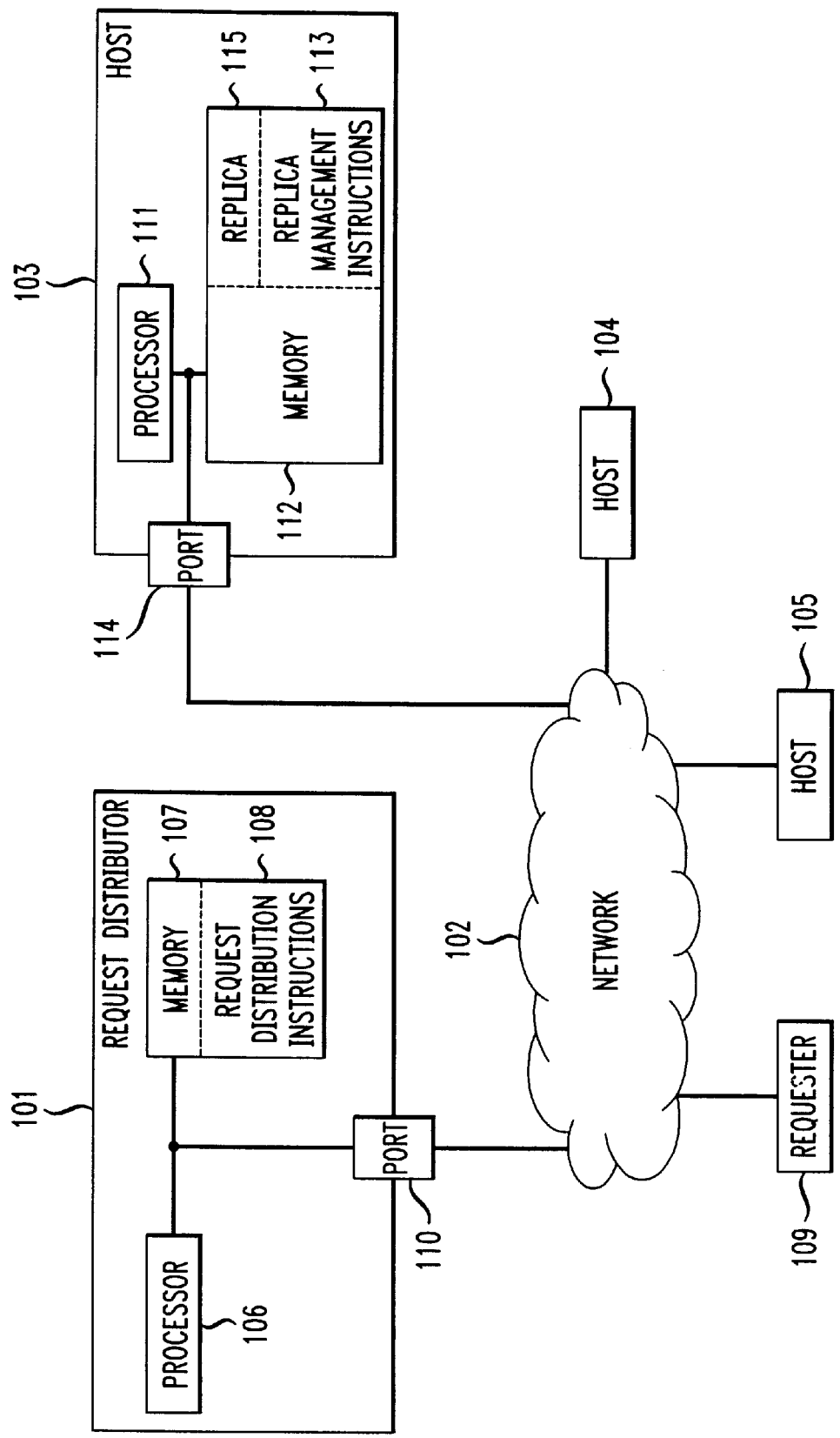
FIG. 1 shows a system in accordance with an embodiment of the present invention.

A system in accordance with an embodiment of the present invention is shown in FIG. 1. The present invention advantageously distributes requests for an object efficiently among replicas of the requested object stored on a plurality of servers. The present invention further manages the placement of replicas of objects, including their replication, migration and deletion on hosts at which the replicas are stored.

A request distributor 101 is connected to a network 102. Hosts 103 104 and 105 are also connected to the network 102. A host is defined to be a computer that stores a replica of an object. An object is a piece of information. A replica is a physical embodiment of an object. For example, a replica is a file stored on a medium that is adapted to be read electronically. One example of a replica is a graphics file stored on a hard disk that is part of a computer. Another example is an executable program stored in random access memory.

The request distributor is comprised of a processor 106 and a memory 107 that stores request distribution instructions 108 adapted to be executed by the processor 106 to perform the method in accordance with the present invention. In one embodiment, request distribution instructions 108 are adapted to be executed by processor 106 to receive a request for an object from a requester 109 connected to the network 102 and distribute the request to a host (e.g., host 103) that stores a replica of the requested object in accordance with the method of the present invention. A replica is replicated to a second host when a replica of the object is newly recognized to be stored at the second host. Processor 106 is coupled to memory 107.

Request distributor 101 also includes a port 110 that is adapted to be coupled to a network 102. Port 110 is coupled to processor 106 and memory 107.

A host 103 includes a processor 111 and a memory 112 that stores a replica 115 and replica management instructions 113 adapted to be executed by the processor 111 to decide whether to delete, migrate or replicate a replica, and to delete, migrate or replicate the replica once the decision is made. Processor 111 is coupled to memory 112. Host 103 also includes a port 114 adapted to be coupled to a network 102. Port 114 is coupled to processor 111 and memory 112.

Embodiments of processors 106 and 111 include microprocessors, such as the Pentium processor manufactured by the Intel Corporation of Santa Clara, Calif., and an Application Specific Integrated Circuit (ASIC), such as a digital signal processor.

Embodiments of memory in accordance with the present invention include a hard disk drive, random access memory, read only memory, flash memory, and optical memory.

The instructions of the present invention can be stored on a medium. Examples of a medium include a hard disk drive, random access memory, read only memory, flash memory and optical memory. The terms "memory" and "medium" are meant to encompass any structure capable of storing information, especially (but not limited to) digital information. The term "adapted to be executed by a processor" is meant to encompass information that must first be processed (e.g., decompressed, unpacked, decrypted, etc. before it can be executed by a processor.

Figure 2:
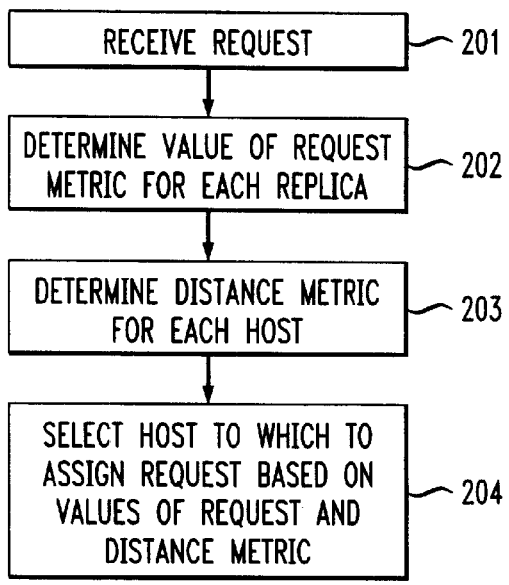
FIG. 2 shows a method for request distribution in accordance with an embodiment of the present invention.

An embodiment of a request distribution method in accordance with the present invention is shown in FIG. 2. A request for an object is received at a request distributor, step 201. The request distributor determines the value of a request metric for each replica of the requested object stored on hosts served by the request distributor, step 202. The request metric for a replica is a historical measure of the requests for the object that have been forwarded to the host that stores the replica of the requested object. In accordance with the present invention, the request metric is advantageously determined substantially independently from any input from any host that stores a replica of any object. This distinguishes the present from the prior art, and advantageously simplifies autonomous placement decisions by the hosts.

An example of a request metric is the number of requests for an object assigned to a host by a request distributor. This number is called the "count" for the replica stored at the host. In another embodiment, the request metric is based upon the time elapsed since the last request serviced by the host. For example, a longer elapsed time would result in a lower request metric than that for a shorter elapsed time since the last request was serviced.

The request metric can be advantageously adjusted by using an affinity value. In one embodiment, the affinity value is an integer whose inverse is multiplied by the count to obtain a new value for the request metric. The affinity value is determined by the replica placement method in accordance with the present invention, and is used to lower or raise the request metric for a replica stored at a host below or above the value it would be were the request metric simply equal to the count. Using an affinity vale can be desirable to take into account geographical factors in the location of the requester in relation to the host that stores the replica in order to improve the efficiency of the request distribution method.

A distance metric is determined for each host at which the requested replica is stored, step 203. The distance metric measures the cost of communicating between the requester and the host. For example, in one embodiment, the distance metric is proportional to the latency between the requester and the host that stores a replica of the requested object. In another embodiment, the distance metric is inversely proportionate to the bandwidth of the channel between the requester and the host.

The request distributor selects a host that stores a replica of the requested object to respond to the request based upon the request metric and the distance metric of the host in relation to the request metric and distance metrics of the other that also store replicas of the requested object, step 204.

Figure 3:
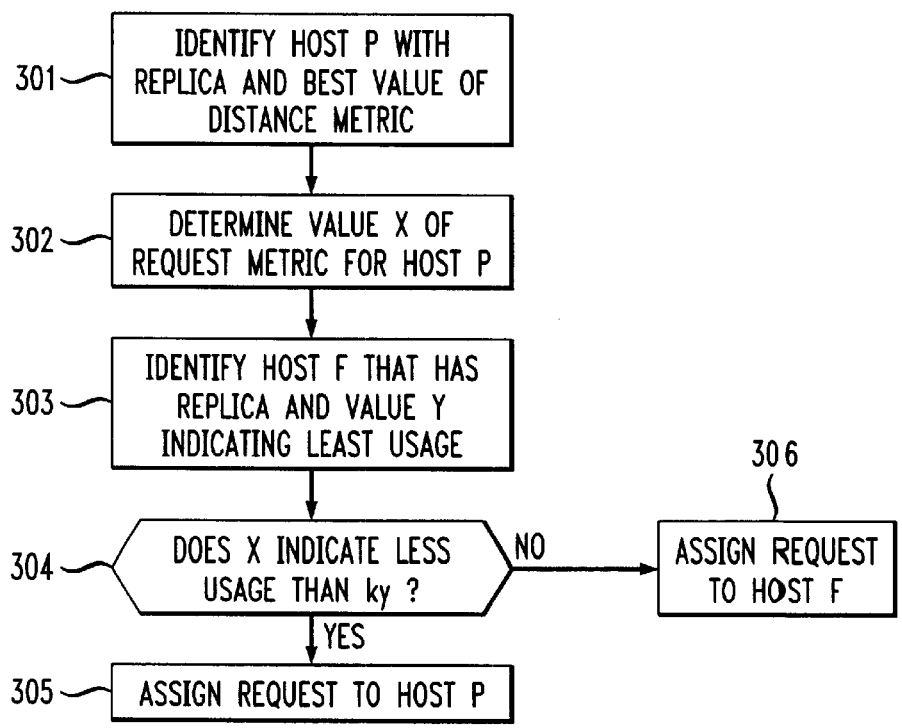
FIG. 3 shows a method for deciding to which host to forward a request for an object based upon the request metric and the distance metric values determined for hosts that store replicas of the requested object in accordance with a first embodiment of the present invention.

In one embodiment, the request distribution decision as to which host to assign the request is made in accordance with the method shown in FIG. 3. A host p is identified that stores a replica of the requested object and that has the best distance metric m in relation to the requester, step 301. For example, in one embodiment, the host that is geographically closest to the requester will be determined to have the best distance metric in relation to the requester. In another embodiment, the host which can communicate the least expensively with the requester will be determined to have the best metric in relation to the requester. The request metric x for host p is determined, step 302. The host f that stores a replica of the requested object and that has the request metric y for the replica that indicates the least usage is identified, step 303. If the value of the request metric x for the host p with the best distance metric in relation to the requester indicates less usage than the value of the request metric of the least used host f when the request metric for host f is multiplied by a predetermined real number k, step 304, then the request is sent to host p, step 305. The term "best distance metric" means a value of a distance metric for a host that indicates that communicating between the requester and the host is less expensive than all other hosts for which distance metrics have been evaluated. Otherwise, the request is sent to host f, step 306. For example, if the request metric is the count, and if k is equal to 4, then if the count of host p is less than the count of host f multiplied by 4, then the request is sent to host p. Otherwise, the request is sent to host f.

Figure 4:
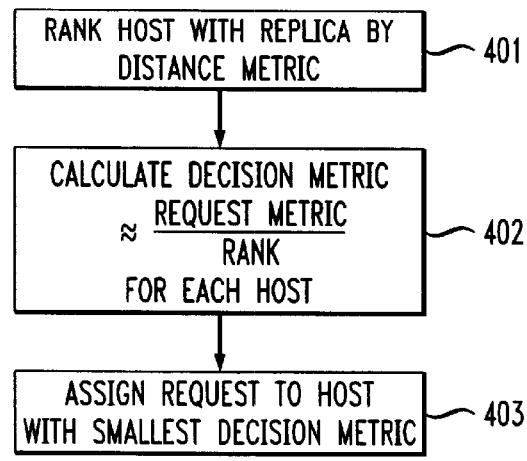
FIG. 4 shows a method for deciding to which host to forward a request for an object based upon the request metric and the distance metric values determined for hosts that store replicas of the requested object in accordance with a second embodiment of the present invention.

In another embodiment, the request distribution decision is made in accordance with the method shown in FIG. 4. Each host that stores a replica of the requested object is ranked in decreasing distance metric in relation to the requester, step 401. For example, if replicas of the requested object are stored on n hosts, then the closest host (as indicated by the distance metric) is assigned a rank of n and the most distant host is assigned a rank of 1. A decision metric is calculated for each host, step 402, where the value of the decision metric for each host is proportionately related to the value of the request metric of the host and inversely related to the rank of the host. The term "proportionately related" means that when the value of the request metric increases, the value of the decision metric increases, and when the value of the request metric decreases, so does the value of the decision metric. The term "inversely related" means that when the value of the rank increases, the value of the decision metric decreases, and when the value of the rank decreases, the value of the decision metric increases. For example, in one embodiment, the decision metric is the count of the host divided by its rank. In another embodiment, the decision metric is the count of the host divided by the product of the rank multiplied by the affinity of the host. The request for the object is sent to the host with the smallest decision metric, step 403.

Figure 5:
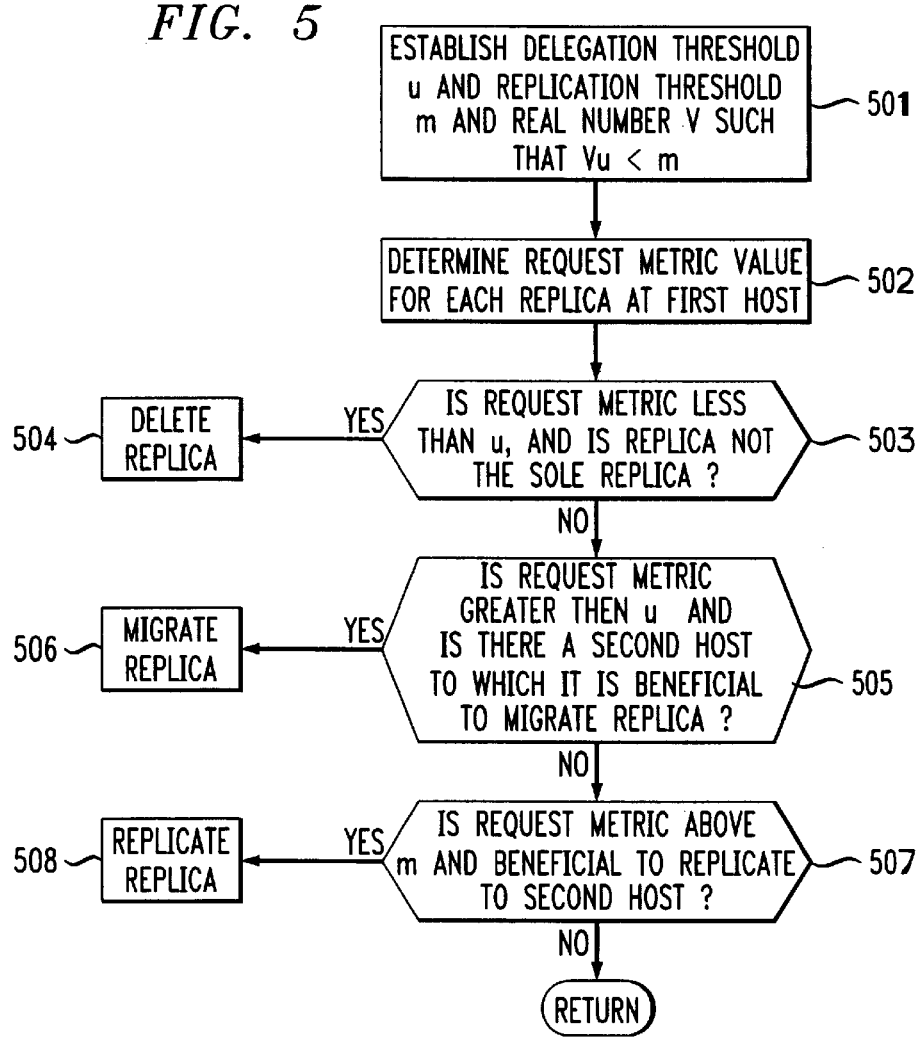
FIG. 5 shows a method for managing the placement of replicas on hosts in accordance with an embodiment of the present invention.

A method for managing the placement of replicas of an object on hosts is shown in FIG. 5. Replica placement decisions and actions are made and taken substantially autonomously by a host. A deletion threshold u and a replication threshold m are established for a first host such that vu is less than m, v being a real number, step 501. For each replica, a request metric is determined for the replica of the requested object stored at the first host, step 502. If the request metric is less than u, and if the replica is not the sole replica, step 503, then the replica is deleted from the first host, step 504. If the request metric is above u, and if it is determined that there is a second host to which it is beneficial to migrate the replica, step 505, then the replica is migrated to the second host, step 506. If the replica is not migrated in step 506, and if the request metric is above m, and if it is determined that there is a second host to which it is beneficial to replicate the replica, step 507, then the replica is replicated to the second host, step 508.

Figure 6:
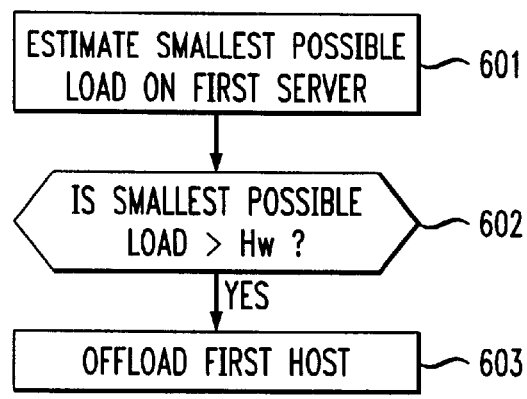
FIG. 6 shows a method for managing the placement of replicas on hosts in conjunction with the method shown in FIG. 5 in accordance with an embodiment of the present invention.

In a method in accordance with one embodiment of the present invention, another method shown in FIG. 6 is performed after the method shown in FIG. 5 is performed. The smallest possible expected value of the load at the first server after performing the steps of the method shown in FIG. 5 is estimated, step 601. It is determined if the smallest possible value of the load at the first host determined in step 601 is larger than a predetermined value hw, which is called a high water mark, step 602. If the smallest possible value of the load determined in step 601 is larger than hw, then the first host is offloaded, step 603.

Offloading the first host means deleting, migrating or replicating the replica of an object on the first host in accordance with more relaxed criteria than those shown in the replica placement method shown in FIG. 5.

Figure 7:
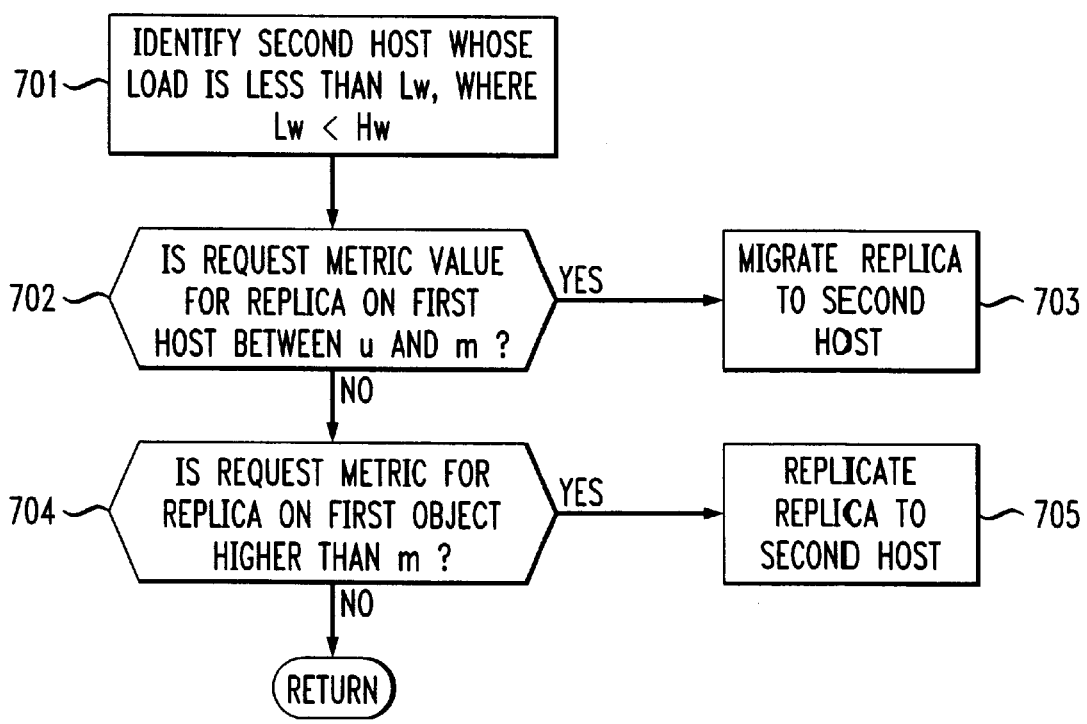
FIG. 7 shows a method for offloading a host in accordance with an embodiment of the present invention.

A method for offloading in accordance with an embodiment of the present invention is shown in FIG. 7. A second host is identified whose load is below a predetermined value lw (called the low water mark) such that lw is smaller than hw, step 701. For each replica of an object stored at the first host, if the request metric of the object is between u and m, then the object is migrated to the second host identified in step 701, step 702. For each replica of an object stored at the first host, if the request metric of the object is above m, then the replica is replicated at the second host identified in step 701, step 703.

Figure 8:
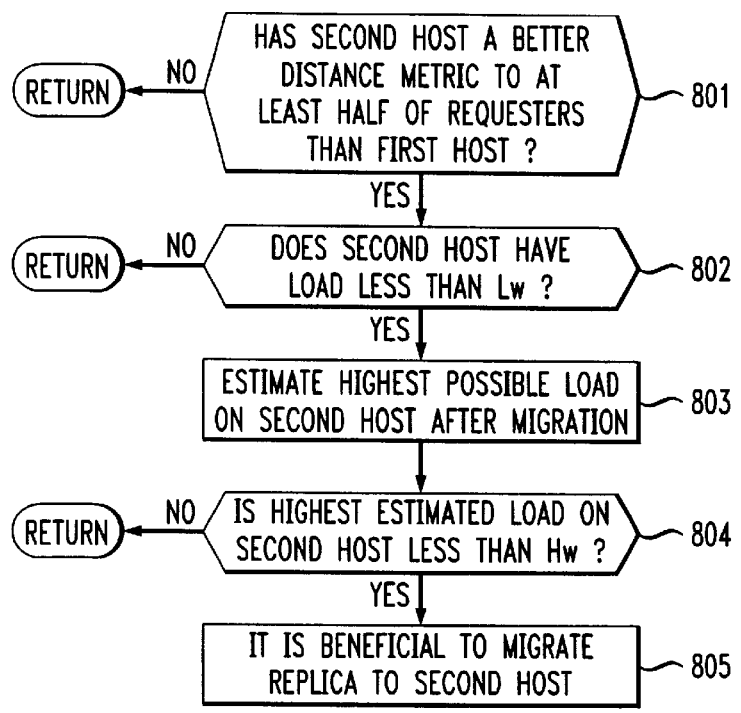
FIG. 8 shows a method for determining if it is beneficial to migrate a replica to a second host in accordance with an embodiment of the present invention.

A method for identifying a second host to which it is beneficial to migrate a replica from a first host to the second host is shown in FIG. 8. It is determined if a second host has a better distance metric than the first host in relation to more than half of the requesters for the object, step 801, and if the second host has a load that is less than lw, step 802. The highest possible load on the second host after a migration is estimated, step 803. It is determined if this load estimate is less than hw, step 804. If the second host has a better distance metric than the first host to more than half of the requesters for the object and if the second host has a load that is less than lw and if the estimated highest load post migration of second host is less than hw, then it is determined that it is beneficial migrate the replica stored at the first host to the second host, step 805.

Figure 9:
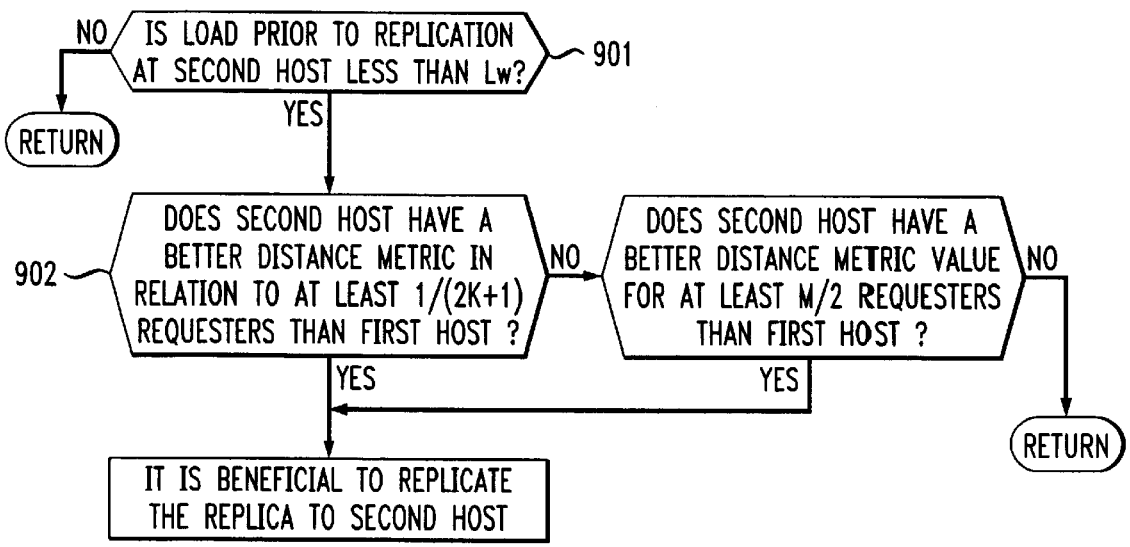
FIG. 9 shows a method for determining if it is beneficial to replicate a replica to a second host in accordance with an embodiment of the present invention.

A method for identifying a second host to which it is beneficial to migrate a replica from a first host to the second host is shown in FIG. 9. It is determined if the load prior to replication at the second host is less than lw, step 901. If the load prior to replication at the second host is less than lw, then it is determined if a second host has a better distance metric in relation to at least $1/(2k+1)$ of the requesters the first-host, where k is the same as the value of k discussed in relation to the method shown in FIG. 3, step 902, and it is further determined if the second host has a better distance metric in relation to the requesters for at least $m/2$ requests for the object than the first host, where m is the replication threshold discussed in relation to the method shown in FIG. 5, step 903. If the second host has a better distance metric in relation to at least $1/(2k+1)$ of the requesters than the first host, or if the second host has a better distance metric in relation to the requesters for at least $m/2$ requests for the object than the first host, then it is determined that it is beneficial to replicate the replica stored at the first host to the second host, step 904.

An embodiment of the present invention is advantageously applied to the Internet, where individual destinations (nodes and networks) are organized into OSPF areas ("areas"), which in their turn are organized into autonomous systems, ASs. There is also a proposal to organize autonomous systems into federations. The present invention extends directly to networks with more hierarchical levels. There are two kinds of nodes—routers, which forward data packets, and processing nodes.

Figure 10:
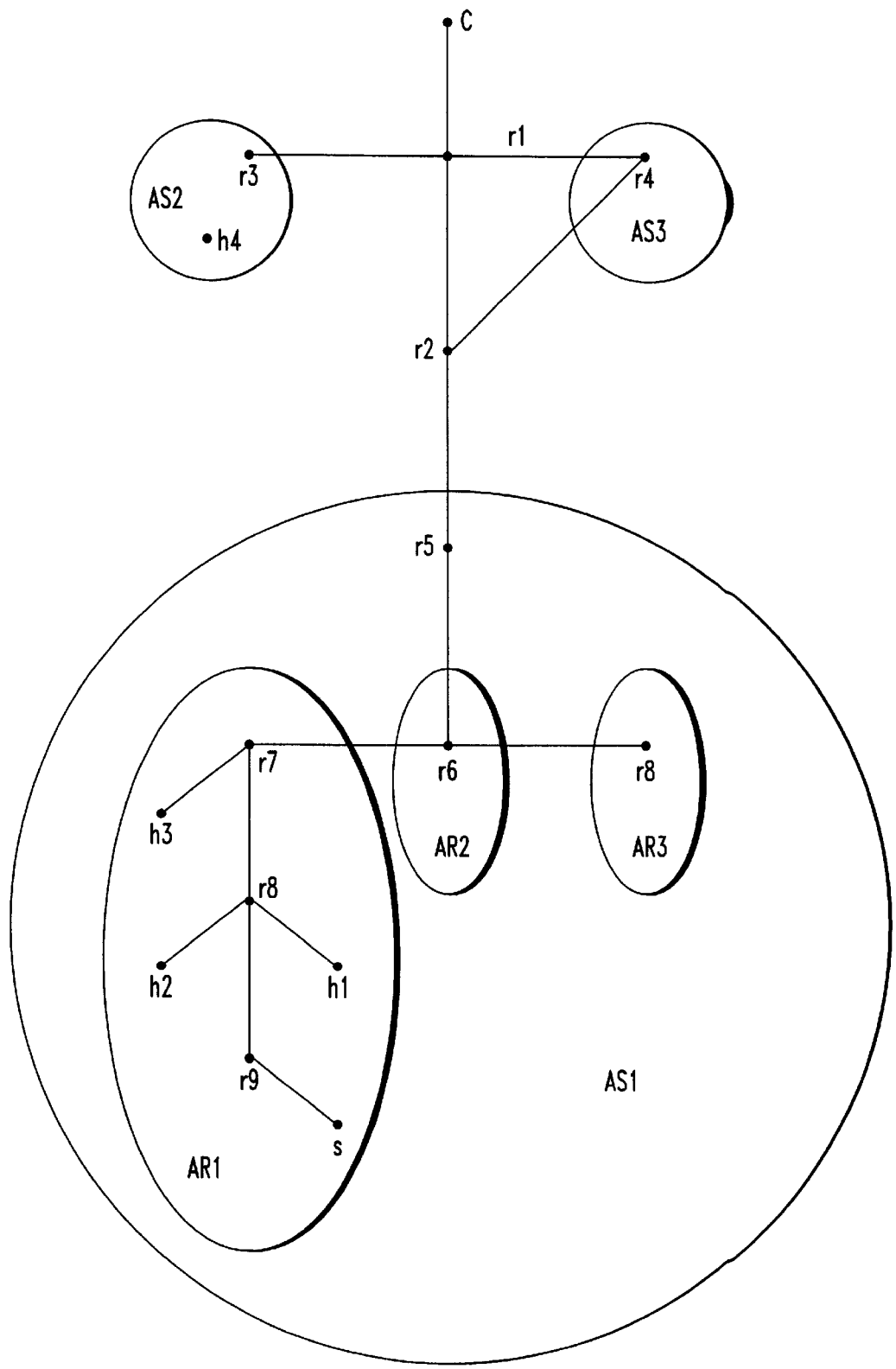
FIG. 10 shows a prior art example of a hierarchical organization in the Internet.

Consider a hosting system that maintains and provides access to objects. Assume that the hosting platform is distributed globally across multiple ASs. In particular, a message between two nodes belonging to the system may traverse third-party autonomous systems en route. An example of a hierarchical network is shown in FIG. 10. The hosting system contains autonomous systems AS1, AS2, and AS3. Autonomous system AS1 comprises areas AR1, AR2, and AR3. A message from nodes in AS1 to nodes in AS2 must travel through outside routers r1 and r2. In fact, hosting systems are often provided by Internet service providers (ISP), in which case the hosting platform may be contained in a single autonomous system.

Nodes, areas and ASs belonging to the hosting system are called internal nodes, areas and ASs. Other nodes, areas and ASs will be referred to as external. Internal nodes that maintain objects and service client requests are called hosting servers or hosts for short. For simplicity, assume homogeneous hosts. Heterogeneity could be introduced by incorporating into the protocol weights corresponding to relative power of hosts.

The notion of geographical proximity can be abstracted by defining proximity functions. In the following definition, the notion of "closeness" reflects geographical distance (communication costs/delay) according to the routing protocol used. Note it is not assumed that the values of these functions are always known.

A proximity function is defined as follows: For a set of internal nodes S and a given Internet node c, function best Node (S,c) defines the set of all nodes from S that are the "closest" to c; for a given internal autonomous system A and a node c within this AS, function best Area (A,c) defines the set of all areas within A that are the "closest" to c. Assume that any node in best Area (A,c) is closer to c than any node in A outside best AS (A,c). This assumption holds for so called broadcast areas (e.g., based on the Ethernet local area network) since communication between any nodes in the area has the same cost. For point-to-point areas this assumption by itself may not hold, in which case our protocols may arrive at suboptimal replica placement. To prevent this, the network administrator should organize internal autonomous systems areas in such a way that communication within areas is never much higher than communication between areas.

For a set of internal autonomous systems A and a given Internet node c, function best AS (A,c) defines the set of all autonomous systems from A that are the "closest" to c. Assume that any node in best AS (A,c) is closer to c than any internal node outside best AS (A,c). This assumption agrees with the way Internet routing protocols consider costs.

The values of proximity functions are sets of, respectively, nodes, autonomous systems, and areas. This reflects the fact that multiple nodes, ASs or areas may be equidistant to node c.

The heuristics discussed for replica placement are based on the routes messages take getting from the source to the destination. Although different messages between a given pair of nodes can take different routes every time, in practice these routes are usually the same or very similar.

Let $s \rightarrow r_1 1 \rightarrow \ldots \rightarrow r_n 1 \rightarrow r_l 2 \rightarrow \ldots r_m 2 \rightarrow r_l 3 \rightarrow R_k 3 \rightarrow c$ be the router path from an (internal) host s to an external client c, where $\{r_i 1\}$ are routers within s's area, $\{r_i 2\}$ are routers in s's AS but outside s's area, and $\{r_i 3\}$ are routers outside s's AS. The preference path between s and c is a sequence bestNode$(AR_s, r_l 1) \rightarrow \ldots \rightarrow \ldots$ bestNode$(AR_s, r_n 1)$ $\rightarrow$bestArea$(AS_s, r_l 2) \rightarrow \ldots \rightarrow$bestArea$(AS_s, r_m 2)$ $\rightarrow$bestAS$(R, r_l 3) \rightarrow \ldots +z, 1$ bestAS$(R, r_k 3) \rightarrow s$, where $AR_s$ is the set of all hosts is s's area, $AS_s$ is the AS to which s belongs, and R is the set of all internal autonomous systems.

In some cases, the same internal AS may be the closest to different routers on the path. In these cases one can simplify the preference path by considering the canonical preference path instead. Let $s \rightarrow E_l \rightarrow \ldots \rightarrow E_n \rightarrow c$ be the preference path from s to c. For all i<j, if $E_i \cap E_j = \emptyset$, replace $E_i$ with $E_j / E_j$. If $E_i$ becomes empty, remove it from the path. Repeat this until $E_i \cap E_j = \emptyset$ for all pairs of the path elements. The resulting path is called the canonical preference path from s to c.

Hereinafter, the term "preference path" will refer to the canonical preference path.

For example, consider the internetwork shown in FIG. 10, where lines represent the proximity functions. A message from host s to an external client c travels via router path $r_9 \rightarrow r_8 \rightarrow r_7 \rightarrow r_6 \rightarrow r_5 \rightarrow r_2 \rightarrow r_1$, resulting in the proximity path s→{h1, h2}→{h3}→{AR2}→{AR2}→{AS3}→{AS2, AS3}→c. The corresponding canonical path is s→{h1, h2}→{h3}→{AR2}→{AS2, AS3}→c.

A message from host s to client c passes by the hosts on the preference path from s to c, assuming that proximity functions are defined appropriately. Given that Internet routing protocols attempt to choose the shortest routes and the routes from these hosts to c are shorter than from s, it would have been advantageous for this request if the request was serviced by one of these hosts. Furthermore, the closer the data is on the preference path to c the greater the benefits. It is this last observation that motivates transforming the preference path to the canonical form.

Assume the availability of the following information: For any client c and any subset S of (internal) hosts, the value of BestNode (S,c); and for any client c and any host s, the (canonical) preference path between c and s. This information can be obtained efficiently in the context of actual IP routing protocols from the routes databases maintained by the routers, and hence, correspond directly to the notions of "closeness" used by the routers, currently the number of hops taken by messages en route from one node to another. As routers become more sophisticated and start using more elaborate metrics (e.g., link bandwidth, link congestion, usage fees), these metrics will be reflected in the routes databases and therefore will be picked up by our proximity functions automatically.

Assume the existence of a uniform load measure that allows load comparison of different servers. In general, the load metric may reflect multiple components, notably computational load and storage utilization. With multiple load components, one can use load vectors, with the following operation rules:

load1>load2 if load1 is greater than load2 in some component; load1<load2 if load1 is smaller than load2 in all components. Note that load1>load2 does not entail load2<load1, so one must be careful with the order of operands. These operations are used, e.g., to compare the server load with its capacity load.

load1+load2 is a load vector whose components are obtained by component-wise addition of operands. This operation is used, e.g., to express the combined load due to hosting two objects.

N*load, where N is the number, is a load vector whose computational components are obtained by multiplying the corresponding components of vector load by N, and whose storage components are equal to the corresponding components of vector load. This operation is used, e.g., to express the load due to hosting an object when the object access rate increases N times.

For compactness, assume that load metric represents a single computational component. The length of the ready queue (e.g., the output of the uptime command in UNIX) can be used as the measure of computational load. Extending the methods to allow vector loads as defined above is trivial to one of ordinary skill in the art.

Assume that an individual server can estimate the fraction of its total load due to a given object on this server. This can be done by keeping track of resource consumption (CPU time, I0 operations, etc.) due to requests for individual objects and dividing up the total load between objects proportionally to their consumption.

Load metrics are usually averaged over some sampling interval preceding the time the metric is recorded. This, a measurement taken right after an object relocation event on a host will not reflect the change in the set of hosted documents. To deal with this technicality, assume that once a host accepts an object, it uses an upper-limit estimate of what its load would be after acquiring the object in deciding whether or not to honor further requests for accepting objects from other hosts. The host returns actual load metrics only when its sampling interval starts after the last object had been acquired. Similarly, the host decides it needs to offload based on a lower-limit estimate of its load. The derivation of these estimates is enabled by our request distribution method.

Hereinafter, $x_p$ will denote a replica of object x on server p; load(p) will denote the load of node p, and load($x_p$) will denote the load on node p due to object x. A request from client c is called local to host s if s ∈BestNode(All_hosts,c). The preference path of a local request contains just the host s.

A challenge in designing a method for distributing requests to replicas is that the method must combine the goal of distributing load with the goal of choosing a replica that is, for example, geographically close to the request. As an example, consider a hosting system with just two hosts, one in America and the other in Europe. Choosing replicas in the round-robin manner would neglect the geography factor. For instance, if an object has replicas on both hosts, with roughly half of requests coming from each region, choosing replicas in the round-robin manner may well result in directing American requests to the European replica and vice versa. On the other hand, always choosing the closest replicas could result in poor load distribution. Assume that the American site is overloaded due to "local" requests. Then, if the closest replicas were always chosen, creating additional replicas in Europe would not help the overloaded site—all requests would still be directed to this site anyway. The goal is a method that would direct requests to their closest hosts in the first case while distributing requests among both hosts (regardless of the origin of requests) in the second case. Finally, the method must be simple, for two reasons. First, it lies on the critical path of servicing the request. Second, it should allow simple reasoning about load bounds on existing and potential object replicas, which would enable the replica placement method to make autonomous placement decisions.

A pseudo code representation of a request distribution method is as follows:

Choose Replica(c, x):
/* Executed by the name service */
easy to see that this replica will have to service only 2N/(n+1), where N is the total number of requests. Thus, by increasing the number of replicas, the load on this replica can be made arbitrarily low. Still, whenever an odd request arrives from another replica's region, this request will be directed to its local replica.

Replica affinities allow the protocol to be very flexible in request distribution. Continuing with our example, assume that request patterns change from being equally divided between the American and European replicas to the 90%-10% split. If neither site is overloaded, the replica placement method can set the affinity of the American replica to 4. With regular request interspacing (i.e., when a request from Europe arrives after every nine requests from America), the request distribution method would direct 1/9 (11%) of all requests, including all those from Europe, to the European site and the rest to the American site.

One problem with this method is that when a new replica is created, it will be chosen for all requests until its request count catches up with the rest of replicas. This may cause a temporary overloading of new replicas. To avoid that, the method resets all request counts to 1 whenever the replica set for the object changes.

Figure 11:
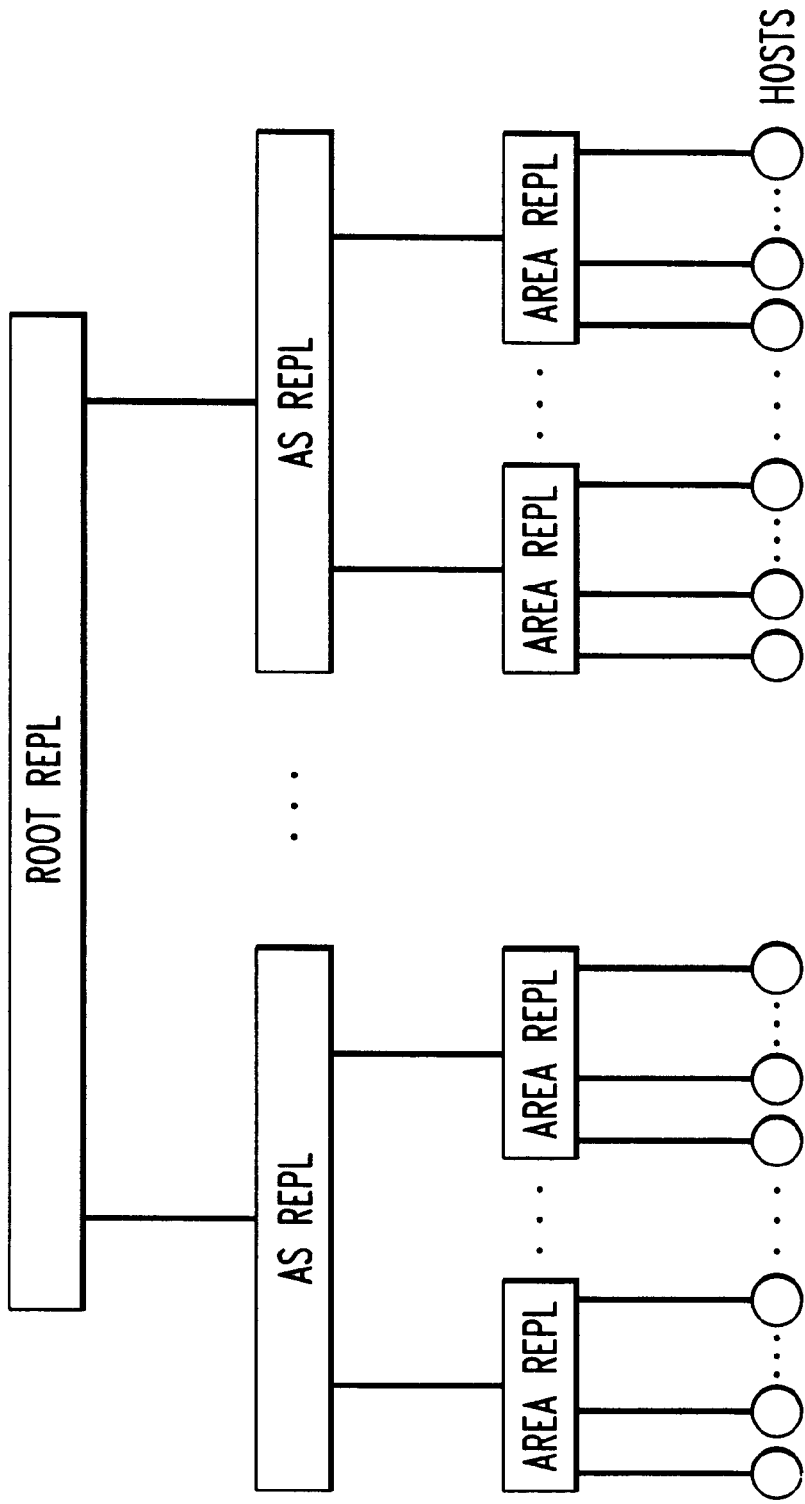
FIG. 11 shows a request distributor hierarchy in accordance with an embodiment of the present invention.

Decisions on replica placement are done in cooperation between hosts and the replication service, which is implemented in one embodiment of the present invention as the replicator hierarchy shown in FIG. 11. As used herein, the term "replicator" is meant to be equivalent to the term "request distributor." There is one replicator in each internal area, one in each internal autonomous system, and one root replicator. It is also convenient to consider hosts as trivial replicators, with a single subordinate host.

Replicators act as representatives of their regions to outside hosts. If a host decides to place a replica in another area or AS, it sends its request to the replicator of this area or AS, and the replicator chooses the host (within the region it represents) to place the object. This arrangement facilitates information hiding and is essential for manageability and scalability of the system when it spans multiple areas and ASs. Adding and deleting hosts becomes an administrative action localized to the area involved; adding or deleting an entire area concerns only the replicator of the parent AS. Computing preference paths by a host becomes reliant only on information available from the routing database of the host's area and autonomous let X be the set of hosts that have a replica of x;
let p be a node in bestNode (X, c) with the smallest value of ratio 1=rcnt($x_p$)/aff($x_p$) and q be the host that has a replica of x with the smallest value of ratio2=rcnt($x_q$)/aff($x_q$);
if(ratio1)/2>ratio2
　choose p;
　rcnt ($x_p$)=rcnt($x_p$)+1;
else
　choose s;
　rcnt($x_s$)=rcnt($x_s$)+1;
endif
end For each replica $x_s$, the method keeps a count of the number of times it chooses this replica, the request count rcnt($x_s$). It also maintains the replica affinity, aff($x_s$). Replica affinity is initially equal to one and then is modified by the replica placement method the ratio rcnt($x_p$)/aff($x_p$) is a relative request count, since it reflects the request count per affinity unit.

When a request from client c arrives, the method begins by identifying a replica $x_q$ with the smallest relative request count, and a replica $x_p$ that is geographically the closest to the client. It then chooses the replica (among these two) by comparing the relative request count of the least-requested replica with the relative request count divided by 2 of the closest replica (a different constant can be chosen, with corresponding modifications to the replica placement method).

Applying this method to the above example, in the first case, both replicas will have roughly the same request count, and therefore every request will be directed to the closest replica (assuming both replicas have affinity one). In the second case, the American site will receive all requests until its request count exceeds the request count of the European site by a factor of two, at which point the European site will be chosen. Therefore, the load on the American site will be reduced by one-third. Creating more replicas would reduce its load even further. Assume that n replicas of an object are created. Even if the same replica is the closest to all requests, it is system. The request distribution method in accordance with the present invention precludes a trivial solution that would replicate every object on every server. Indeed, since this method is oblivious to server loads, it distributes requests to all available replicas. Thus, excessive replicas would cause many requests to be sent to distant hosts. The replica placement protocol therefore creates new replicas only if it is likely to be beneficial for either client proximity or server load reasons.

In accordance with one embodiment of the present invention, each host s maintains the following state for each object it keeps, $x_s$. For each geographical entity E (which can be hosts, areas, or autonomous systems) that appeared on preference paths of some requests to $x_s$ in the last sampling interval, host s keeps the count of the number of these appearances, cnt(E, $x_s$), referred to as the access count of E. In particular, cnt(s, $x_s$) cnt($x_s$) gives the total access count for $x_s$. It is known that, for a given request, nodes on its preference path represent preferable locations for the object. So, an entity that frequently appears in preference paths may be a good candidate for placing an object replica.

Host s also keeps the distance from s to E on preference paths, averaged over the requests for $x_s$, dist(E, $x_s$). The distance is averaged because preference paths may change over time.

Finally, s maintains the load due to each object $x_s$ it keeps, load($x_s$), and replica affinity, aff($x_s$). Affinity is a compact way of representing multiple replicas of the same object on the same host. When the replica is first created, its affinity is initialized to 1; when an object is migrated or replicated to a host that already has a replica of this object, its affinity is incremented. Similar to relative request counts, a ratio cnt(E,$x_s$)/aff($x_s$) is called a relative access count of candidate E.

A replicator r maintains the minimum host load, min_load($r_i$), for each of its child replicators $r_i$. For a child r_min_load($r_i$) is the higher-bound load estimate of the least-loaded host among $r_i$'s descendant hosts. This state is maintained as follows: the lowest-level replicators (hosts) periodically report their load to their parent replicators. Upon collecting all reports, the parent replicator records the minimum host loads, and in turn sends the smallest reported load to its parent. Between rounds of load reports, a replicator may also modify its state during execution of the protocols below.

A host s periodically performs a method to decide on replica placement for its objects. An embodiment of such a method is shown as follows in pseudo code:

---

DecidePlacement( ):
/* Executed by host s*/
if load(s) > hw offloading = Yes;
if load(s) < lw offloading = No;
for each $x_s$
　if$\frac{cnt(s \ xs)}{aff(x_s)}$ < u
　　decrement aff($x_s$) if it was greater than 1, or drop $x_s$ otherwise
　　(unless $x_s$ is the sole replica of x in the system);
　else
　　Loop through candidates($x_s$) in the decreasing order of dist(E, $x_s$).
　　For each candidate E such that cnt(E,$x_s$)/aff($x_s$) > 0.5
　　　send MigrateRequest($x_s$, load( $x_s$)/aff( $x_s$) to E's replicator, $r_E$;

-continued

```
        if r_E responded with "OK"
            decrement aff( x_s) if it was greater than 1, or drop
            x_s otherwise; break from loop;
        endif
    endloop
endif
if x_s has not been dropped or migrated AND cnt(s,x_s)/aff(x_s) > m
    Loop through candidates( x_s), in the decreasing order of dist(E, x_s).
    For each candidate E such that cnt(E,x_s)/aff(x_s)≧m/2 OR
    cnt(E,x_s)/cnt(s,x_s)
>1/6
        send ReplicateRequest(x_s, load(x_s)/aff(x_s)) to r_E ,
        where r_E is the replicator
of E;
        if r_E responded with "OK"
            break from loop;
        endif
    endloop
endif
endfor
if offloading = Yes AND no objects were dropped, migrated or replicated
    send OffloadRequest(s) to the parent replicator of s;
endif
```

There are several tunable parameters in the above-illustrated protocol:

Low and high watermarks for server load, lw and hw;
Deletion threshold u and replication threshold m.

The parameters must be chosen subject to a constraint 4u<m. A replica can be dropped if its count falls below u, it can only migrate if its count is between u and m, and it can either migrate or be replicated if its count is above m.

The request distribution method guarantees that the load on any replica of an object after creating an extra copy will be at least one quarter of the of the load on any existing replica before replication. Knowing this, and by adhering to the above condition on u and m, each host can make an autonomous decision to replicate an object based just on its own replica load, without creating a vicious cycle of replica creations and deletions. Indeed, every replica after replication will have the load exceeding u, so no replicas will be dropped.

A host s can be in one of the two modes of operation. If its load exceeds high-water mark hw, it switches to an offloading mode, where it sheds objects to other hosts, even if it is not geographically beneficial. Once in this mode, the host continues in this manner until its load drops below a low water mark, lw. Then, it moves objects only if it is geographically beneficial, and stays in this mode until its load again exceeds hw. Water-marking is a standard technique to add stability to the system.

After establishing its mode of operation, s examines access counts of each of its objects to decide on its placement. The main components of the placement decision are:

Choose objects whose placement must change, and decide between dropping, migrating, or replicating these objects.

For each object that is to be migrated or replicated, choose the new location to host this object.

An affinity unit of an object is dropped if its relative access count is below a deletion threshold u. (It should not delete the sole replica of an object in the system. The request redirection service is a convenient place to ensure that, since it can arbitrate among competing replica deletions.

An object $x_s$ is chosen for migration if there is a candidate E that appears in preference paths of over 50% of requests for this object. This restriction is a heuristic that aims at migrating an object to a node that would be closer to most of the requests. In addition, it prevents an object from migrating back and forth between nodes in most cases.

An object $x_s$ is chosen for replication if it has not been migrated and if (a) its total relative access count exceeds m and (b) there is a candidate E such that either (ba) the access count of E is over one-sixth of the total access count for the replica, or (bb) the per affinity unit access count of E exceeds m/2. Condition (a) is to avoid a vicious cycle of replica creations and deletions as discussed earlier. Condition (b) is a heuristic that replicates to a candidate only if it was closer than s to some minimum number of requests, either relative to the total number of requests received by s, or in terms of the absolute per-affinity unit value.

Condition (ba) assures that, when s has the sole replica of object x, creating an additional replica will statistically improve the proximity of requests to their servicing hosts. Condition (bb) allows bootstrapping the replication process of an extremely popular object even if the first replica to be created would hurt the request proximity. By demanding the candidate to have minimum access count of m/2, it prevents the new replica from migrating right back, giving the protocol time to create further replicas elsewhere. Note that these are just heuristics, and it is easy to provide examples of detrimental replication.

When object $x_3$, is to be replicated or migrated, s attempts to place the replica on the farthest among all qualified candidates. This is a heuristic that improves the responsiveness of the system.

To replicate object $x_3$, on a candidate E, host s initiates a replication protocol, an example of which is shown in pseudo code as follows:

```
ReplicateRequest (x_s, load (x_3)):
/* Executed by replicator r.*/
    if r is a host
        if load (r) > lw
            Send "Refuse" to invoker;
            exit;
        endif
        if r does not have x already
            copy x from host s;
            aff(x_r) = 1;
        else
            af f(x_r) = af f(x_r) + 1
        endif
        load (r) load(r) + 4load(x_3);
        Send Done (load(r)) to invoker;
        exist;
    endif
    /*r is a non-leaf replicator */
    let r_min be the replicator with the smallest minimum host
    load among child replicators of r;
    send ReplicateRequest (x_x , load) to r_min
    if r_min responded with Done (load)
        Update MinLoads (r_min , load);
        send Done (min_load) to invoker;
    else
        send "Refuse" to invoker;
    endif
end
Update MinLoads (r_min, load):
    Min_load (r_min) = load;
    min_load = min {min_load (r_1), . . . , min_load (r_m)}
    where r_1, . . . , r_m are child replicators of r;
```

Host s sends a replication request to E's replicator $r_E$, which includes the ID of the object to be replicated and the load on host s generated due to $x_3$. $r_E$ forwards this request along the path with the lowest-loaded hosts. When this request reaches a host, the host checks if its load is below the low watermark, in which case it copies the object from s or increments the affinity of an existing replica of the object, updates its upper-bound load estimate, and sends acknowledgment back up the tree to $r_E$. Each replicator on the path updates its upper-bound estimates of the minimum host load for itself and the child replicator involved. These estimates are based on the fact that, when a host q acquires a new replica $x_q$, extra load imposed on q is bounded by four times the load of an existing replica, load($x_3$).

The protocol for migration to the chosen candidate is the essentially same as the protocol for replication. The only difference is that, in addition to the requirement that the receiver's load be below the low watermark, there are two additional restrictions: (a) a host that already has a replica of x will accept the migration request only if the relative access count of x on the sending host is below m; and (b) the recipient host accepts the migration request only if its upper-bound load estimate after the proposed migration is below the high watermark. Both these conditions are heuristics targeting especially heavily accessed objects. Condition (a) gives a popular object a chance to replicate on multiple nodes even if a majority of requests are local to a single node (cf. condition (bb) for replication). Condition (b) prevents migration to a host in cases when a single object migration would bring the recipient's load from below the low watermark to above the high watermark. Without it, a vicious cycle could occur when an object load-migrates from a locally overloaded site, only to migrate back to the site.

Note the absence of a similar restriction in the replication heuristics. Overloading a recipient site temporarily may be necessary in this case in order to bootstrap the replication process. The vicious cycle is not a danger here because each replication brings the system into a new state.

When host s is in Offloading mode, it migrates or replicates objects to other nodes even if it is not beneficial geographically. The protocol contains two stages. In the first stage the protocol identifies a recipient of the objects from s. The recipient is chosen to be the nearest node to s whose load is below lw. This stage is shown in the following pseudo code embodiment:

```
Offload Request (s):
/*Executed by the replicator r*/
    let r_min be the replicator with the smallest minimum host
    load among child replicators of r;
    if min_load(r_min) < lw
        send Recipient request(s) to r_min;
        if r_min responded with OffloadDone (load)
            UpdateMinLoads(r_min, load);
            exit;
        elseif r_min responded with OffloadFailed (load)
            UpdateMinLoads (r_min, load);
            send Offload Request(s) to parent unless r is the root;
        endif
    else
        send Offload Request(s) to parent unless r is the root;
end
Recipient request(s):
/* executed by node q */
    if q is a host
        if load(q) < lW
            initiate offloading from s by sending OffloadOffer (load(1)) to s;
            if any objects were offloaded
                send OffloadDone (load((q) to invoker;
            else
                send OffloadFailed (load(q))to invoker;
            endif
        else
            send Offload Filed (load (q)) to invoker;
        endif
        exit;
```

```
endif
    let r_min be the replicator with the smallest minimum host
    load among child replicators of q;
    if min_load(r_min) < lw
        send Recipient request(s) to r_min;
        if r_min responded with Offload Done (load)
            UpdateMinLoads (r_min, load);
            send OffloadDone (min_load(q)) to invoker;
        elseif r_min responded with OffloadFailed (load)
            Update MinLoads (r_min, load);
            send OffloadFailed (min_load (q)) to invoker;
        endif
    else
        Send OffloadFailed (min_load(q)) to invoker;
    endif
end
```

This stage is initiated by the request for offloading from s to its parent replicator. This request travels up the tree until it find the replicator that has a child replicator with the minimum host load below lw. Then, this replicator send Recipient request message down the tree along the path with the lowest load until it reaches a host q.

Upon receiving Recipient request, host q starts the second stage of the protocol by sending OffloadOffer to s. A pseudo code illustration of the method for this stage is shown as follows:

```
/*Executed by the offloading host s*/
while load(s) > lw AND recipient_load < lw AND not all
objects have been examined
    let x_3, be the unexamined object with the highest value of
    cnt(E,x_s)/cnt(s,x_s) for some E
    ifcnt(x_s)/aff(x_s) ≤ m
        send MigrateRequest(x_s, load(x_s)/aff(x_s) to q;
        load(s) = load(s) − load(x_s)/aff(x_s) − 0.5 * load(x_s)/(aff(x_s) − 1);
        recipient_load = recipient_load + 4 * load(x_s)/aff(x_s);
        decrement aff(x_s) if it was greater than 1, or drop x_s, otherwise;
    else
        send ReplicateRequest(x_s,load(x_s)/aff(x_s) to q;
        load(s) = load(s) − .66 * load(x_s)/aff(x_s);
        recipient_load = recipient_load + 4 * load(x_s)/aff(x_s);
    endif;
endwhile;
end
```

The offloading host goes through all its objects, starting with those that have a higher rate of "foreign" requests, and attempts to send them to the recipient. Unlike in the DecidePlacement method, the offloading host does not try to migrate heavily loaded objects—objects with the relative access count above replication threshold m can only be replicated. The reason is that load-migrating these objects outright undo a previous replication.

To decide conservatively when to stop the offloading process, the sending node re-calculates the lower-bound estimate of its load and the upper-bound estimate of the recipient load upon ever object migration or replication. When the former falls below or the latter rises above the low watermark, the offloading stops until actual load measurements are available.

Note that these estimates reflect the load changes only due to the migration or replication performed; concurrent change sin replica placement on other nodes can obviously affect the load of the nodes involved in the offloading. However, this is true for even a single object transfer, when no load estimates are used. Using estimates does not worsen our load prediction while allowing transferring objects in bulk, which is essential for responsiveness of the system to demand changes.

Consider the following questions:
1. For a given request, how to find the closest host having a replica of the requested object. This information is used in the request distribution method.
2. How the host receiving a client request obtains the preference path for this request. While the trace route tool[33] can give the router path information, it generates prohibitively high network traffic to be used for routine statistics collection.

The answer to these questions would differ slightly depending on the protocols considered. To be specific, assume that BGP is used to route IP messages between autonomous systems (AS) of the Internet, and OSPF is used to route IP messages within an autonomous system, the most common (and recommended) open routing protocols.

Under BGP/OSPF, the whole Internet is divided into administrative domains called autonomous systems (AS), identified by unique AS numbers. All message traffic external to an AS is handled by border routers. Inter-AS routing is based on path vectors maintained by the border routers. A path vector on a given border router contains the numbers of ASs on the best path from this router to every network in the Internet.

All border routers of the same AS communicate between themselves to decide, for each external destination X, on the best router(s) to deliver packets to X. Then, the best router(s) advertises within the AS that it can deliver traffic to this destination. If multiple border routers advertise this, one is chosen on the case by case basis, depending on the cost of reaching the border router from the source of the message within the AS. Thus, the BGP routing database within an autonomous system X contains the following information, for every external destination A: (a) which border routers are the best to reach A from nodes within X—this set of routers are called Border Routers (A, A) below—and (b) the path vectors from these routers to A. In particular, the function BGP_hops (A,X) that gives the number of elements in the corresponding path vector).

A large autonomous system can be further divided into OSPF areas. Areas within the same AS are connected by area-border routers, which belong to both areas they connect and handle all inter-area traffic. Within a given area, the area routers maintain a link state database, which contains link records and summary records. Link records describe all links within the areas and the cost metrics for sending messages over these links. This information is sufficient to compute the closest path between any two hosts in the area. Summary records are advertise by area-border routers to the areas they connect. Summary records advertised by area-border routers to the areas they connect. Summary records advertised by a router r to its area contain the total cost of delivering a message from r to each destination i outside this area but within the autonomous system. In combination, link and summary records in the link state database of an OSPF area allow computing the cost of delivering a message from any node i within the area to any node j within the autonomous system, denoted OSPF_metric (i,j) below.

Normally, OSPF areas within an AS are organized hierarchically: there is a backbone area that contains all border routers in the AS, and leaf areas, each connected to the backbone area by one or more area-border routers.

The request distribution service extracts the following information from the routing databases of internal autonomous systems, using, for example, the functionality provided by Distributed Director from CISCO.

The BGP routing database in every internal autonomous system IAS is queried to obtain functions Border Routers (A, IAS) and BGP_hops (A, IAS). The OSPF link state database of the backbone area in each IAS is queried to obtain function OSPF_metric (br, s), for every border router br and every hose s.

Using this information, the request indirection service computes the mapping (A×host)→distance for each autonomous system A and internal host host, where distance is represented as a pair in which the first component is the number of BGP hops from host's autonomous system to A, and the second component is the OSPF cost of delivering a message form host to the nearest border router that advertised the external route to A within host's autonomous system. Formally:

distance=(BGP_hops (A, IAS (host)), min [OSPF_metric (r, host)|r ∈Border Routers (A, IAS (host))]), where IAS (host) denotes the (internal) AS to which host belongs. In agreement with Internet routing, which first uses BGP to route a message to the destination's autonomous system and then OSPF to deliver it within the autonomous system, assume that distance ($d_1$, $d_2$) is greater than distance ($d'_1$, $d'_2$) if either $d'_1 > d'_1$ or $d_1 = d'_1$ and $d_2 > d'_2$. The indirection service uses this mapping to find the closest host to a given client request, thereby implementing a function bestNode (X, c) in the request distribution method.

Each internal host h extracts the following information (much of it is a specialization of information obtained by the indirection service to h's IAS). Let IAS (h) and area (h) be, respectively, the autonomous system and OSPF area to which h belongs.

From the BGP routing database of IAS (h), host h obtains function Border-Routers (a)=Border-Routers (A, IAS (h)), for every external destination A;

From the function BGP_hops (A, IAS) h computes function Best IAS (A), which gives internal autonomous system(s) with the minimal paths to A.

From the link stat database of area (h), host h obtains function OSPF_metric (br, h) for each border router br in IAS (h) and function BestHost ($lr_i$), which, for each router $lr_i$ within area (h), gives the closest host(s) to $lr_i$. In other words, BestHost ($lr_i$)={$h_{best}$∈area (h)|OSPF_metric ($lr_i$, $h_{best}$)= $h_j$∈area (h) {OSPF_metric ($lr_i$, $h_j$)}.

From the link state database of the backbone area of h's autonomous system, h obtains function Best ABR ($r_i$) that, for each backbone area router $r_i$, gives the closest area-border router(s) to $r_i$, among area-border routers connecting the backbone area to leaf areas.

Functions BestHost, BestABR, and BEST IAS represent specializations of proximity functions bestNode, bestArea and bestAS to sub-domains needed by host h (BestABR corresponds to bestArea because there is a mapping from area-border routes to the OSPF leaf areas they connect.) With the exception of BestIAS, which can be obtained from the request indirection service, all other information is obtained from routing databases within h's autonomous system. Host h uses this information to compute a database of preference paths to every destination A on the Internet using the following procedure.

1. Let br be the border router with the minimal OSPF cost from h, according to function OSPF_metric (br, h), among all border routers in BorderRouters(A). Let br→$A_i$...$A_p$→A be the AS path from br to A from br's path vector database. Replace each $A_i$ that is not an internal autonomous system with the closest IAS(s) Ri=BestIAS ($A_i$), resulting in a path br→R...$R_p$→A. Drop the first element (br) from the path.

2. Let abr be the area-border router on the shortest path from h to br. From the link State database of the backbone OSPF area of h's IAS, obtain the router path from abr to br, abr→$r_i$ ... $r_m$→br. Replace each router $r_i$ with the id of leaf OSPF area(s) $a_i$=area (abr$_i$) where abr$_i$=Best ABR ($r_i$), and router br with the id of OSPF area $a_{br}$=area (abr$_{br}$), where abr$_{br}$=BestABR(br). The resulting path is abr→$a_1$ ... $a_m$→$a_{br}$. Drop the first element (abr) from the path.

3. Let h $r_1$ ... $r_n$→abr be the router path from h to abr according to the link state of area (h); Replace each $r_i$ (including abr) with the closest host $h_i$=BestHost ($r_i$) in a path h→$h_1$ ... $h_n$→$h_{abr}$.

4. Concatenate all paths and use the resulting path $$h \to h_1 \ldots h_n \to h_{abr} \to a_i \ldots a_m \to a_{br} \to R_1 \ldots R_p \to A$$

and compute the canonical path to A according to its definition.

All objects can be divided into the following types:

1. Objects that do not change as the result of use access. These objects can be either static HTML pages, or dynamic pages that retrieve information, i.e., weather reports, or map-drawing services.
2. Objects in which the only per-access modification involves collecting access statistics or other commuting updates.
3. Objects where updates that results from user accesses do not commute.

Objects in the first category can change only as result of updates by the content provider. Consistency of these updates can be maintained by using the primary copy approach, with the node hosting the original copy of the object acting as the primary. Depending on the needs of the application, updates can propagate from the primary asynchronously to the rest of the currently existing replicas either immediately or in batches using epidemic mechanisms. These objects can be replicated or migrated freely, with the provision that either the primary copy of an object never migrates or the location of the primary copy is tracked by the redirection module. In the case of batched update propagation, techniques used in Web caching to prevent (or bound) staleness of cached copies (see, e.g., Alex adaptive copy expiry (see Cate, Alex, *A Global File System*, in Proc. 1992 USENIX File System Workshop, pp. 1–12, 1992) and piggybacked validation (see B. Krishnamurthy and C. E. Wills, *Study of Piggyback Cache Validation for Proxy Caches in the World Wide Web*, in Proc. USENIX Symp. on Internet Technologies and Systems}, pp. 1–12, December 1997) can also be used here to prevent serving stale content to clients. Multiple studies have shown that an overwhelming majority (over 90%) of Web object accesses are to this category of objects.

Objects in the second category can still be replicated using our protocol if a mechanism is provided for merging access statistics recorded by different replicas. The problem arises if content served to clients includes some access statistics, as is the case of access counter appearing in some pages. If application requires this information to always be served current, then such objects become equivalent to objects in the third category for the purpose of our protocol.

Objects in the third category, in general, can only be migrated in our protocol. In the case when the application can tolerate some inconsistency, updates can be propagated asynchronously, either immediately after the access or in batches. In this case, one may still find it beneficial to allow the protocol to create a limited number of replicas. The protocol itself remains the same subject to the additional restriction that the total number of replicas remain within the limit.

The present invention provides an efficient and cost effective system and method for distributing requests for objects among hosts that store replicas of the requested object, and for managing the placement of replicas of objects.

What is claimed is:

1. A method for placing replicas of an object in a network, comprising the steps of:
    a. establishing a deletion threshold u and a replication threshold m for a first host such that vu is less than m, v being a real number;
    b. for each host at which a replica is stored, determining a request metric for the replica;
    c. if the request metric is less than u, and if the replica is not the sole replica, then deleting the replica from the first host;.
    d. if the request metric is above u, and if it is determined that there is a second host to which it is beneficial to migrate the replica, then migrating the replica to the second host; and
    e. if the request metric is above m and no migration occurred in step d, then
        i. determining if there is a second host to which it is beneficial to replicate the replica of the requested object stored at the first host; and
        ii. if a second host is determined to be beneficial to which to replicate the replica stored at the first host, then replicating the replica stored at the first host at the second host.

2. The method of claim 1, further comprising the steps of:
    f. estimating the expected value of the smallest load at the first server after performing steps a through e of claim 1;
    g. determining if the value of the smallest load determined in step f is larger than a predetermined value hw;
    h. if the value of the smallest load determined in step f is larger than hw, then offloading the first host.

3. The method of claim 2, wherein offloading the first host comprises the steps of:
    i. identifying a second host whose load is below a predetermined value lw such that lw is smaller than hw;
    j. for each replica of an object stored at the first host, if the request metric of the object is between u and m, then migrating the object to the second host identified in step i;
    k. for each replica of an object stored at the first host, if the request metric of the object is above m, then replicating the object at the second host identified in step i.

4. The method of claim 1, wherein determining if there is a host to which it is beneficial to migrate the replica stored at the first host comprises the steps of:
    a. determining if a second host has a better distance metric than the first host in relation to more than half of the requesters for the object and if the second host has a load that is less than lw, and estimating the highest possible load on second host after a migration, and determining if this estimation is less than hw;
    b. if the second host has a better distance metric than the first host to more than half of the requesters for the object, and if the second host has a load that is less than lw, and if the estimated highest load of the second host after the migration is less than hw, then determining that it is beneficial to migrate the replica stored at the first host to the second host.

5. The method of claim 1, wherein determining if there is a host to which it is beneficial to replicate a requested object comprises the steps of:
   a. determining if the load prior to replication at the second host is less than lw;
   b. if the load prior to replication at the second host is less than hw, then:
      i. determining if a second host has a better distance metric in relation to at least $1/(2k+1)$ of the requesters than the first host, where k is the same as the value of k in claim 1;
      ii. determining if the second host has a better distance metric in relation to the requesters for at least m/2 requests for the object than the first host, where m is the replication threshold; and
      iii. if the second host has a better distance metric in relation to at least $1/(2k+1)$ of the requesters than the first host, where k is the same as the value of k in claim 1, or if the second host has a better distance metric in relation to the requesters for at least m/2 requests for the object than the first host, then determining that it is beneficial to replicate the replica stored at the first host to the second host.

6. A medium that stores replica management instructions adapted to be executed by a processor to perform the steps of:
   a. establishing a deletion threshold u and a replication threshold m for a first host such that vu is less than m, v being a real number;
   b. determining a request metric for the replica of the requested object stored at the first host;
   c. if the request metric is less than u, and if the replica is not the sole replica, then deleting the replica from the first host;
   d. if the request metric is above u, and if it is determined that there is a second host to which it is beneficial to migrate the replica, then migrating the replica to the second host; and
   e. if the request metric is above m and no migration occurred in step d, then
      i. determining if there is a second host to which it is beneficial to replicate the replica of the requested object stored at the first host; and
      ii. if a second host is determined to be beneficial to which to replicate the replica stored at the first host, then replicating the replica stored at the first host at the second host.

7. The medium of claim 6, wherein said replica management instructions are adapted to be executed by a processor to perform the steps of:
   a. determining if a second host has a better distance metric than the first host in relation to more than half of the requesters for the object and if the second host has a load that is less than lw, and estimating the highest possible load on second host after a migration, and determining if this estimation is less than hw;
   b. if the second host has a better distance metric than the first host to more than half of the requesters for the object, and if the second host has a load that is less than lw, and if the estimated highest load of the second host after the migration is less than hw, then determining that it is beneficial to migrate the replica stored at the first host to the second host.

8. The medium of claim 6, wherein said replica management instructions are adapted to be executed by a processor to perform the steps of:
   a. determining if the load prior to replication at the second host is less than lw;
   b. if the load prior to replication at the second host is less than hw, then:
      i. determining if a second host has a better distance metric in relation to at least $1/(2k+1)$ of the requesters than the first host, where k is the same as the value of k in claim 1;
      ii. determining if the second host has a better distance metric in relation to the requesters for at least m/2 requests for the object than the first host, where m is the replication threshold; and
      iii. if the second host has a better distance metric in relation to at least $1/(2k+1)$ of the requesters than the first host, where k is the same as the value of k in claim 1, or if the second host has a better distance metric in relation to the requesters for at least m/2 requests for the object than the first host, then determining that it is beneficial to replicate the replica stored at the first host to the second host.

* * * * *